United States Patent
Gilpatrick (10) Patent No.: US 9,901,949 B2
(45) Date of Patent: *Feb. 27, 2018

(54) WATER SPRAYING SYSTEM (71) Applicant: Briggs & Stratton Corporation, Wauwatosa, WI (US)

(72) Inventor: Richard J. Gilpatrick, Whitewater, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 480 days.

This patent is subject to a terminal disclaimer.

(21) Appl. No.: 13/918,701

(22) Filed: Jun. 14, 2013

(65) Prior Publication Data

US 2013/0277451 A1  Oct. 24, 2013

Related U.S. Application Data (63) Continuation of application No. 12/411,139, filed on Mar. 25, 2009, now Pat. No. 8,485,796.

(51) Int. Cl.
  *B05B 12/08* (2006.01)
  *F04B 49/03* (2006.01)
  (Continued)

(52) U.S. Cl.
  CPC .......... *B05B 12/08* (2013.01); *A01G 25/145* (2013.01); *B05B 12/085* (2013.01); *B08B 3/026* (2013.01);
  (Continued)

(58) Field of Classification Search
  CPC . F04B 53/00; F04B 49/03; B08B 3/02; B08B 3/028; B08B 3/026; B05B 9/04;
  (Continued)

(56) References Cited

U.S. PATENT DOCUMENTS 828,705 A   8/1906  Bode
1,262,539 A   8/1906  Bode
(Continued)

FOREIGN PATENT DOCUMENTS

DE  38 40 787 A1  6/1990
DE  299 08 357 U1  8/2000
(Continued)

OTHER PUBLICATIONS

English Abstract of JP2006263628A dated Oct. 2006.*
(Continued)

*Primary Examiner* — Nathan Zollinger
(74) *Attorney, Agent, or Firm* — Foley & Lardner LLP (57) ABSTRACT

A water spraying system includes an engine, a pump driven by the engine, the pump including a pump inlet configured to be fluidly coupled to a water source and a pump outlet providing water at an increased water pressure, a sprayer fluidly coupled to the pump outlet, the sprayer including a flow restriction valve and a trigger for manipulating the flow restriction valve so that movement of the trigger selectively opens and closes the flow restriction valve, a flow sensor configured to sense a flow of water into the pump, and a controller coupled to the flow sensor. The controller is configured to turn off the engine following a set time period of sensed flow below a threshold flow.

17 Claims, 8 Drawing Sheets

(51) Int. Cl.
  *A01G 25/14* (2006.01)
  *B08B 3/02* (2006.01)
  *F04B 17/05* (2006.01)
  *F04B 17/06* (2006.01)
  *B05B 1/16* (2006.01)

(52) U.S. Cl.
  CPC ............ *F04B 49/03* (2013.01); *B05B 1/1654* (2013.01); *F04B 17/05* (2013.01); *F04B 17/06* (2013.01); *Y10T 137/85978* (2015.04)

(58) Field of Classification Search
  CPC ..... B05B 9/0413; B05B 9/0416; B05B 12/08; B05B 12/085; A01G 25/145; Y10T 137/85978
  USPC ..................................... 417/20, 33, 313, 364
  See application file for complete search history.

(56) References Cited

U.S. PATENT DOCUMENTS

| | | | |
|---|---|---|---|
| 1,369,567 A | 2/1921 | Smith | |
| 2,678,457 A | 1/1950 | Demo et al. | |
| 2,540,240 A | 2/1951 | Boyle | |
| 3,030,890 A | 4/1962 | Galik | |
| 3,114,164 A | 12/1963 | Riordan | |
| 3,283,352 A | 11/1966 | Hu | |
| 3,383,044 A | 5/1968 | Norstrud et al. | |
| 3,748,678 A | 7/1973 | Ballou | |
| 3,786,869 A | 1/1974 | McLoughlin | |
| 3,885,739 A | 5/1975 | Tuttle | |
| 3,931,830 A | 1/1976 | Gritz | |
| 4,084,281 A | 4/1978 | Smith | |
| 4,089,079 A | 5/1978 | Nicholson | |
| 4,124,332 A | 11/1978 | Nishijyo | |
| 4,135,860 A | 1/1979 | Van Nederkassel | |
| 4,207,640 A | 6/1980 | Sekula et al. | |
| 4,227,862 A | 10/1980 | Andrew et al. | |
| 4,234,007 A * | 11/1980 | Titone et al. ............ 137/101.19 | |
| 4,238,074 A | 12/1980 | Coons | |
| 4,249,282 A | 2/1981 | Little | |
| 4,290,735 A | 9/1981 | Sulko | |
| 4,373,444 A | 2/1983 | Cunnington | |
| 4,387,850 A | 6/1983 | Gerber | |
| 4,417,826 A | 11/1983 | Floros | |
| 4,461,052 A | 7/1984 | Mostul | |
| 4,507,053 A | 3/1985 | Frizzell | |
| 4,513,466 A | 4/1985 | Keddie et al. | |
| 4,532,666 A | 8/1985 | Smyth | |
| 4,551,037 A | 11/1985 | Kille et al. | |
| 4,574,752 A * | 3/1986 | Reichert et al. ....... 123/198 DB | |
| 4,618,100 A | 10/1986 | White et al. | |
| 4,621,770 A | 11/1986 | Sayen | |
| 4,763,373 A | 8/1988 | Sanchez | |
| 4,856,133 A | 8/1989 | Sanchez | |
| 5,007,127 A | 4/1991 | Paolo | |
| 5,029,758 A | 7/1991 | Chayer | |
| 5,129,121 A | 7/1992 | Gelman | |
| 5,186,142 A * | 2/1993 | Bruneili et al. ......... 123/339.16 | |
| 5,259,556 A | 11/1993 | Paige et al. | |
| 5,259,733 A | 11/1993 | Gigliotti et al. | |
| 5,381,962 A | 1/1995 | Teague | |
| 5,395,052 A | 3/1995 | Schneider et al. | |
| 5,421,520 A | 6/1995 | Simonette et al. | |
| 5,529,460 A | 6/1996 | Eihusen et al. | |
| 5,619,766 A | 4/1997 | Zhadanov et al. | |
| 5,649,334 A | 7/1997 | Henriquez et al. | |
| 5,741,124 A | 4/1998 | Mazzucato et al. | |
| 5,794,580 A | 8/1998 | Galletti | |
| 5,911,256 A | 6/1999 | Tsai | |
| 5,913,982 A | 6/1999 | Phillips | |
| 5,975,423 A | 11/1999 | Rice et al. | |
| 6,021,539 A | 2/2000 | Zhadanov et al. | |
| 6,164,496 A | 12/2000 | Gregory | |
| 6,189,811 B1 | 2/2001 | Rudy | |
| 6,464,052 B1 * | 10/2002 | Hsiao ............................ 188/290 | |
| 6,468,052 B2 * | 10/2002 | McKain et al. .............. 417/306 | |
| 6,561,481 B1 | 5/2003 | Filonczuk | |
| 6,571,805 B2 | 6/2003 | Hoenisch et al. | |
| 6,687,924 B2 | 2/2004 | Wright et al. | |
| 6,688,855 B2 | 2/2004 | Beckerman | |
| 6,854,669 B2 | 2/2005 | Anthony | |
| 6,913,221 B2 | 7/2005 | Moon et al. | |
| 6,915,541 B2 | 7/2005 | Alexander | |
| 6,921,060 B2 | 7/2005 | Weed, Jr. | |
| 6,981,613 B1 | 1/2006 | Kamisugi | |
| 7,017,603 B1 | 3/2006 | Rosine et al. | |
| 7,080,953 B2 | 7/2006 | Delaine, Jr. | |
| 7,083,120 B2 | 8/2006 | Gilpatrick et al. | |
| 7,217,053 B2 | 5/2007 | Alexander et al. | |
| 7,222,644 B2 | 5/2007 | Pianetto et al. | |
| 7,281,903 B2 | 10/2007 | Reverberi et al. | |
| 7,316,368 B2 | 1/2008 | Moon et al. | |
| 7,472,842 B2 | 1/2009 | Gilpatrick et al. | |
| 7,762,787 B2 | 7/2010 | Kawakami et al. | |
| 8,271,141 B2 | 9/2012 | Cummings et al. | |
| 8,425,203 B2 * | 4/2013 | Gardner et al. .............. 417/234 | |
| 8,485,796 B2 * | 7/2013 | Gilpatrick ..................... 417/313 | |
| 8,727,233 B2 * | 5/2014 | Karp ..................... B08B 3/026 239/1 | |
| 2004/0231723 A1 | 11/2004 | Harrington et al. | |
| 2005/0013708 A1 | 1/2005 | Peeler et al. | |
| 2005/0017117 A1 | 1/2005 | Moon et al. | |
| 2005/0161538 A1 | 7/2005 | Cattaneo et al. | |
| 2005/0164554 A1 | 7/2005 | Cattaneo et al. | |
| 2006/0027253 A1 * | 2/2006 | Kaiser ........................... 134/94.1 | |
| 2006/0083634 A1 | 4/2006 | Dexter et al. | |
| 2006/0245941 A1 * | 11/2006 | Sharp ............................ 417/298 | |
| 2007/0113368 A1 | 5/2007 | Alexander | |
| 2007/0114319 A1 | 5/2007 | Anderson et al. | |
| 2007/0125878 A1 | 6/2007 | Hahn et al. | |
| 2008/0014096 A1 | 1/2008 | Gilpatrick | |
| 2008/0050246 A1 | 2/2008 | Bevington | |
| 2008/0083077 A1 | 4/2008 | Alexander et al. | |
| 2008/0245425 A1 | 10/2008 | Alexander | |
| 2008/0245899 A1 | 10/2008 | Parris et al. | |
| 2008/0300727 A1 | 12/2008 | Zarowny et al. | |
| 2009/0269218 A1 | 10/2009 | Gardner et al. | |
| 2013/0092745 A1 * | 4/2013 | Karp ................................ 239/1 | |

FOREIGN PATENT DOCUMENTS

| | | |
|---|---|---|
| JP | 2006-263628 | 10/2006 |
| JP | 2006263628 A * | 10/2006 |
| WO | WO-2007/027149 | 3/2007 |

OTHER PUBLICATIONS

Machine Translation of JP2006263628A dated Oct. 5, 2006.*
Human English Translation of JP2006263628A dated Oct. 5, 2006.*
Amendment and Reply for U.S. Appl. No. 12/411,139, dated Apr. 20, 2012, 13 pages.
Amendment and Reply for U.S. Appl. No. 12/411,139, dated Nov. 3, 2011, 15 pages.
U.S. Appl. No. 12/411,139, filed Mar. 25, 2009.
Energy Tips-Pumping Systems, Pumping Systems Tip Sheet #12, Control Strategies for Centrifugal Pumps with Variable Flow Rate Requirements, U.S. Department of Energy, May 2007, 2 pages.
Garden Hose Centrifugal Pump I BIC Superstore, Flint Walling/Star HPP360 Garden Hose Centrifugal Pump, printed on Jan. 6, 2009, from Internet address: http://www.bicsuperstore.com/Garden-Hose-Centrifugal-Pump/M/B000DZKZ02.htm, 3 pages.
Garden Hose Comfort Grip Nozzle 7 Pattern #594 by Gilmour Manufacturing, http://www.hardwareandtools.com/invt/3774379, retrieved on Jan. 6, 2009, 4 pages.
Gauges, Water Pumps, and Flow Meters from Premium Water Filters, Premium Water Filters, printed on Jan. 6, 2009, from Internet address: http://www.premium-water-filters.com/gauges-pumps.htm, 12 pages.
International Search Report and Written Opinion for Application No. PCT/US2010/028157, dated Aug. 31, 2011, 23 pages.

(56) References Cited

OTHER PUBLICATIONS

Invitation to Pay Additional Fees and Partial International Search Report for International Application No. PCT/US2010/028157, dated Jun. 10, 2011, 10 pages.
Office Action for U.S. Appl. No. 12/411,139, dated Aug. 16, 2012, 15 pages.
Office Action for U.S. Appl. No. 12/411,139, dated Nov. 23, 2012, 18 pages.
Request for Continued Examination for U.S. Appl. No. 12/411,139, dated Apr. 20, 2012, 3 pages.
U.S. Office Action, U.S. Appl. No. 14/051,325, 18 pages (dated Jun. 29, 2015).

* cited by examiner

WATER SPRAYING SYSTEM

CROSS-REFERENCE TO RELATED APPLICATIONS

This application is a continuation of U.S. application Ser. No. 12/411,139, filed Mar. 25, 2009, which is incorporated herein by reference in its entirety.

BACKGROUND

The present invention relates generally to the field of garden hose spray systems. More specifically, the invention relates to a system including a pump and control mechanism for boosting the flow rate, pressure, momentum, and/or exit velocity of a water flow (or water stream) through the system.

Household garden hoses may be used for a wide variety of tasks around a home. However, at pressures supplied by household plumbing systems, the pressure of outgoing streams may be fairly low, for example approximately 0.4 megapascals (MPa), or approximately 60 pounds per square inch (psi). To compensate, household garden hoses may be fitted with a wide variety of fittings and/or nozzles to increase the water pressure in the system and provide a stream of water with an increased exit velocity. However to increase the outgoing velocity of the water stream, such nozzles may greatly reduce the outgoing flow rate, which is the product of average velocity and flow cross-section—for example from approximately 315 to 630 cubic centimeters per second ($cm^3/s$), or approximately 5 to 10 gallons per minute (gpm), down to less than 190 $cm^3/s$ (3 gpm).

Devices other than garden hose boosting pumps, such as powered pressure washers for example, are known to be used to clean dirt, paint, or mold from pavement, brick face, cement, or other surfaces. To achieve such results, these devices may generally provide an energized water stream but with a greatly increased pressure (e.g., approximately 9.6 MPa (1400 psi)) and a greatly reduced flow rate (e.g., approximately 80 to 90 $cm^3/s$ (1.3-1.4 gpm)). Heavy duty pressure washers may provide streams with even higher pressures (e.g., 20 to 35 MPa (3000-5000 psi)) and possibly greater flow rates (e.g., approximately 225 $cm^3/s$ (3.5 gpm)). The high pressure streams of heavy duty pressure washers may facilitate more demanding tasks, such as resurfacing or cutting of materials, which may require extremely powerful flows.

SUMMARY

One embodiment of the invention relates to a water spraying system including an engine, a pump driven by the engine, the pump including a pump inlet configured to be fluidly coupled to a water source and a pump outlet providing water at an increased water pressure, a sprayer fluidly coupled to the pump outlet, the sprayer including a flow restriction valve and a trigger for manipulating the flow restriction valve so that movement of the trigger selectively opens and closes the flow restriction valve, a flow sensor configured to sense a flow of water into the pump, and a controller coupled to the flow sensor. The controller is configured to turn off the engine following a set time period of sensed flow below a threshold flow.

Another embodiment of the invention relates to a water spraying system including an engine, a pump driven by the engine, the pump including a pump inlet configured to be fluidly coupled to a water source and a pump outlet providing water at an increased water pressure, a sprayer including a flow restriction valve and a trigger for manipulating the flow restriction valve so that movement of the trigger selectively opens and closes the flow restriction valve, a hose fluidly coupling the pump outlet to the sprayer, a sensor configured to sense a water flow state, and a controller coupled to the sensor. The sensor is located proximate the pump inlet. The controller is configured to turn off the engine when the sensed water flow state is below a threshold for a set time.

Another embodiment relates to a pressure washer including an engine, a pump driven by the engine, the pump including a pump inlet configured to be fluidly coupled to a water source and a pump outlet providing water at an increased water pressure, a sprayer including a flow restriction valve and a trigger for manipulating the flow restriction valve so that movement of the trigger selectively opens and closes the flow restriction valve, a hose fluidly coupling the pump outlet to the sprayer, a flow sensor configured to sense a flow of water provided to the pump, and a controller coupled to the flow sensor. The controller is configured to turn off the engine following a set time period of sensed flow below a threshold flow.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Garden hoses and sprayers can be used for a broad range of applications, including for example cleaning cars, watering plants, washing home windows and siding, rinsing out a warehouse floor or garage, and the like. However, garden hoses alone may produce water streams that are too weak to wash off certain materials, such as tree sap or bird residue. As such, booster systems for garden hoses may be very useful. The added boost may produce water streams powerful enough to handle everyday household cleaning tasks that are outside of the capabilities of garden hoses alone.

Figure 1:
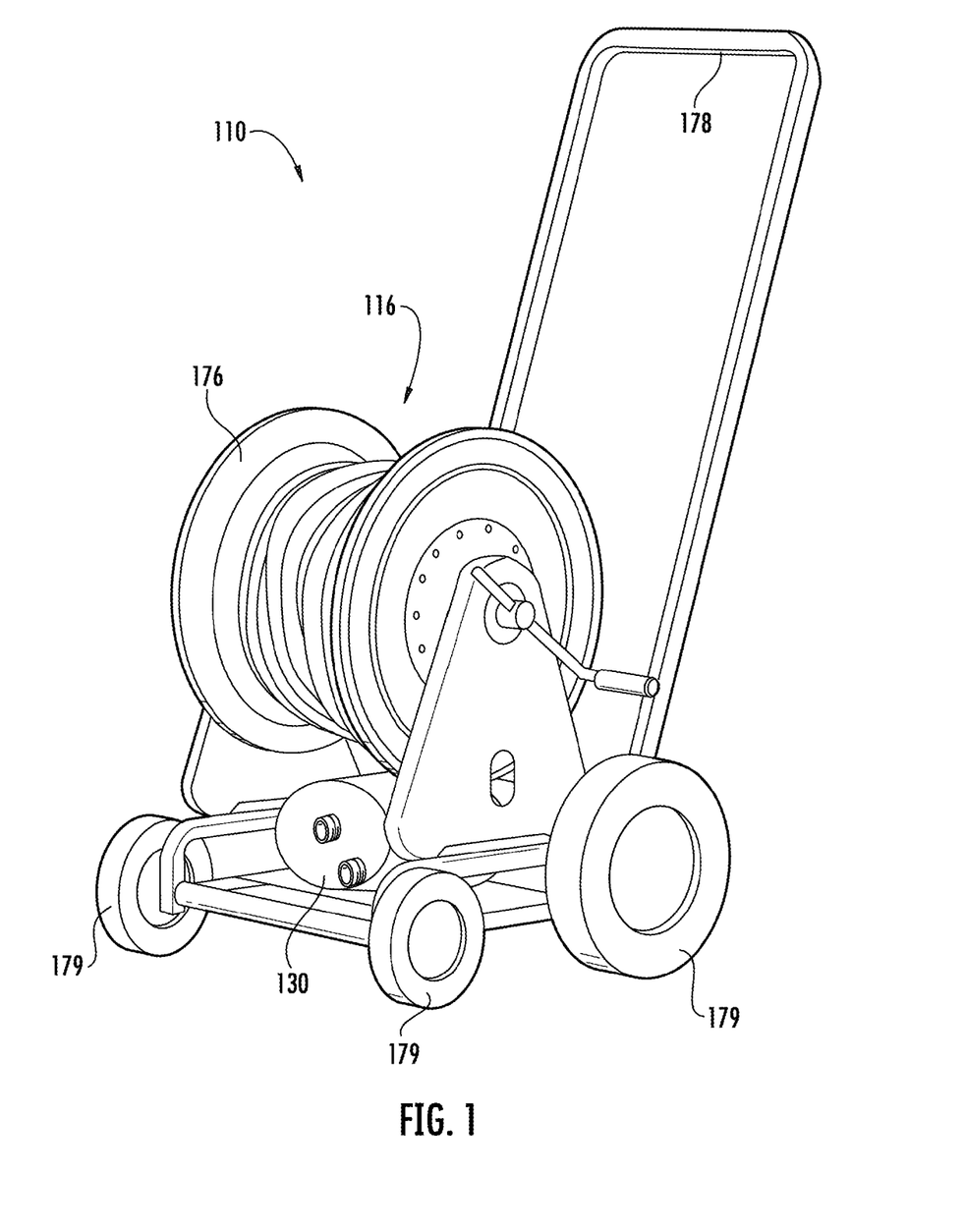
FIG. 1 is a perspective view of a portable garden hose spray system according to an exemplary embodiment.

Referring to FIG. 1, according to an exemplary embodiment, the booster water spraying system is in the form of a portable wheeled-cart 110 that includes a pump 130 stored on or in the cart 110, a windable garden hose reel 176, a handle 178, a hose 116, and wheels 179. Other embodiments include a cart with a roll-bar frame to protect the pump 130 and other components from damage if the cart is overturned. When the hose 116 couples the pump to a water source, the pump 130 may energize the water flow. Other exemplary embodiments include hose storage structures other than the hose reel 176, such as hose racks that are not windable, but instead require a user to wrap the hose around a frame. Still other exemplary embodiments include a pump with a hose rack that may be mounted to the side of a house or building. Such embodiments may form booster water spraying system kits.

Figures 2A, 2B, 2C:
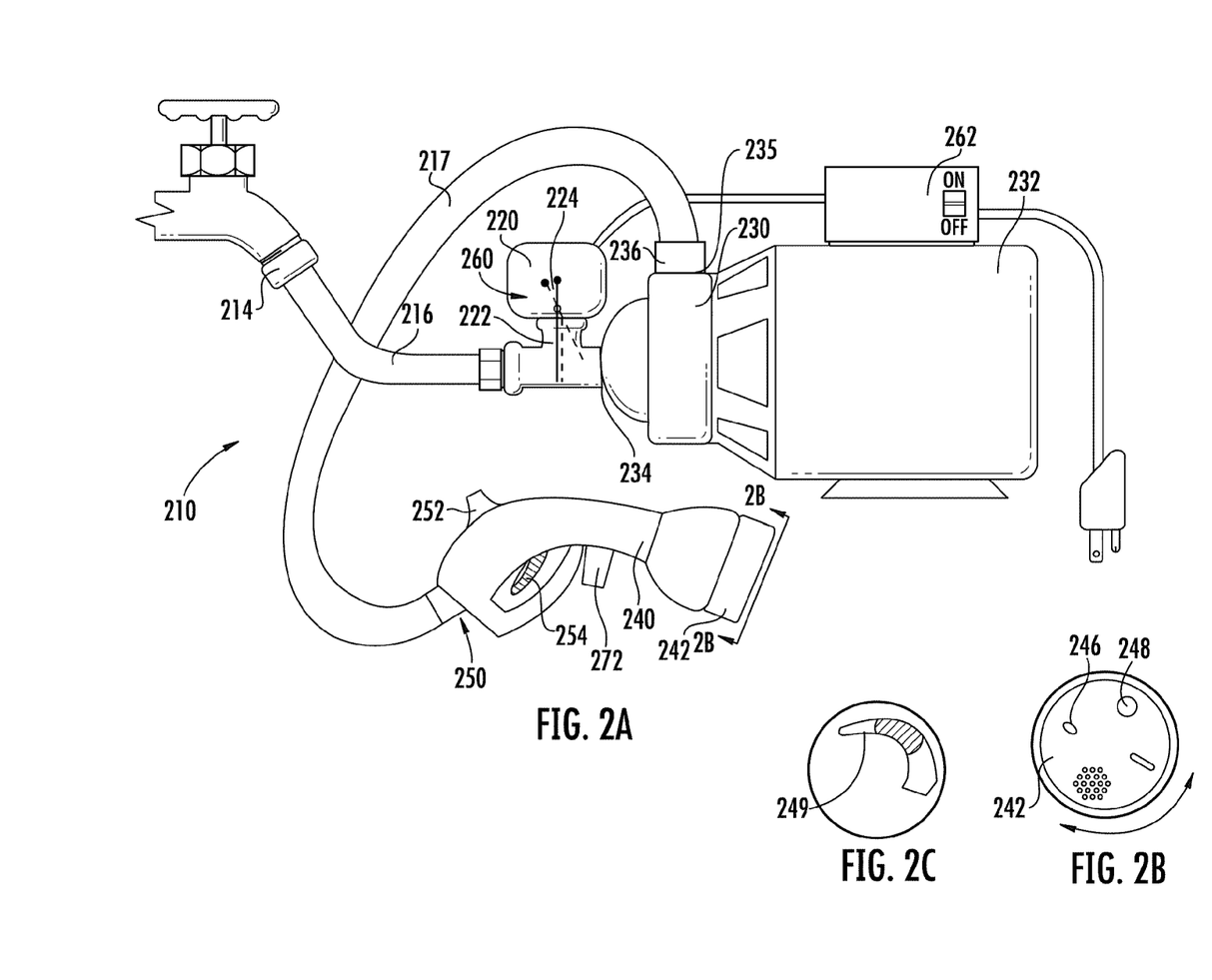
FIG. 2A is a side view of a garden hose spray system according to an exemplary embodiment.
FIG. 2B is an end view of a spray head for the garden hose spray system of FIG. 2A according to an exemplary embodiment.
FIG. 2C is an end view of a spray head for the garden hose spray system of FIG. 2A according to another exemplary embodiment.

Referring now to FIG. 2, a garden hose spray system 210 embodiment that includes a pump 230 is shown according to an exemplary embodiment. The garden hose spray system 210 is configured to be coupled to an existing, conventional garden hose system including a hose 216 coupled to, for example, a typical garden hose fitting or coupling connector 214 (e.g. three-quarters inch female garden hose connector, hose bib, hose faucet, sillcock, threaded coupling, hose fitting, etc.). According to another exemplary embodiment, a similar garden hose sprayer system may be coupled to a water supply with a permanent plumbing (e.g., brass pipes, PVC pipes, and the like). According to a preferred embodiment, the pump 230 is a centrifugal pump driven by motor 232. The pump 230 includes a connector or connectors for attaching a garden hose, such as a three-quarters inch female and /or male fitting, snap-lock, and/or other connector. The water is drawn into the pump 230 by a rotating impeller through an input 234 opening, port, hole, and the like and expelled through an output 235. The output 235 is connected to a hose coupler 236, which allows for releasable attachment of a garden hose. The pump 230 is configured to energize (i.e., add kinetic or potential energy to, as opposed to electrify) the water flow, such as by converting the centrifugal force of the rotating impeller to an increased static pressure of the water flow and, in turn, increasing a related pressure and a flow velocity with which the water flow exits the garden hose spray system 210.

In some embodiments, the motor 232 is a alternating current electric motor, and the motor 232 is compatible with a standard household electrical system (e.g., 120-volt motor). An electrical plug and cord may couple the motor to a current source. In other embodiments the motor 232 is powered by a direct current electric motor and battery. In still other embodiments the motor 232 is a combustion engine.

Certain embodiments of the present invention relate to a booster for a garden hose as opposed to a "true" pressure washer. Conversely, it should be noted that some "pressure washers," especially the heavy duty pressure washers, can damage objects that are hit directly by a correspondingly high-powered water stream or by an object propelled by the high-powered stream. However, some embodiments of this invention provide a mechanism for energizing a water stream from a household water system with an increased flow rate and/or pressure that is suitable to everyday-type cleaning applications. For example, in certain scenarios, such as for cleaning operations (e.g., removing stuck-on plant debris from a vehicle; dried-on bird waste from a window; or spider webs from an eve of a high roof line, out of reach of a garden hose having unboosted pressure and flow) a user may desire an increased flow rate and/or pressure beyond the capabilities of a garden hose and faucet without a booster pump, but not with the reduced flow rate and much higher pressures of "true" pressure washers. Thus, according to some exemplary embodiments, pumps associated with the presently claimed invention have a maximum pressure capacity (e.g., maximum settings) of less than approximately 7 MPa (1000 psi), preferably less than approximately 4 MPa (600 psi), and even more preferably less than approximately 1.5 MPa (200 psi). For example, in a preferred embodiment the maximum pressure capacity (e.g., maximum setting) is less than approximately 400 kilopascals (kPa) (60 psi); and in another preferred embodiment it is less than approximately 550 kPa (80 psi). Also, certain exemplary embodiment systems have a water flow rate capacity (e.g., maximum setting) of at least approximately 250 cm$^3$/s (4 gpm), preferably at least approximately 325 cm$^3$/s (5 gpm), and even more preferably at least approximately 350 cm$^3$/s (5.5 gpm). For example, in a preferred embodiment the water flow rate capacity (e.g., maximum setting) is approximately 375 cm$^3$/s (6 gpm). In some embodiments, activating the pump increases the water flow rate by a magnitude approximately greater than 1.25 but less than five, preferably by a magnitude approximately greater than 1.5 but less than three, such as approximately two.

While the pump 230 is a centrifugal-type pump, other embodiments utilize other styles of pumps, including reciprocating pumps and/or positive displacement pumps. For example, at least one embodiment includes a pump that uses a piston-style positive displacement pump. Centrifugal pumps may be preferred over piston-style pumps because no bypass may be needed with the former for a water flow to continue to flow when power is not provided to the pump. It should be noted that in some exemplary embodiments the pump is an electric pump having a ground fault protection, such as a circuit breaker, fuse, and the like. The ground fault protection may help to protect a user from accidental electric shock. Additionally, the ground fault protection may help to protect the pump system from short-circuiting, overloading, and the like, which may be damaging to the system.

Still referring to FIG. 2A, according to an exemplary embodiment, a switch 224 is part of a flow-sensitive switch assembly 260 (or "flow monitoring switch") in a switch housing 220 and dually functions as a pump controller, wherein the flow monitoring switch 260 includes both a sensor portion 222 and a switch portion 224. The sensor 222 measures, detects, monitors, evaluates, and/or is affected by characteristics (e.g., flow rate) of the water flow through the garden hose spray system 210, and thus providing the sensor a status based upon the flow characteristics. For example, in the system 210, the sensor 222 is coupled to the pump 230 proximate to an inlet 234 to detect a flow rate of water into the pump 230. The flow monitoring switch 260 is configured to recognize a threshold flow rate such that the flow monitoring switch 260 is engaged (e.g., "on" or a closed switch) for water flowing above the threshold flow rate and disengaged (e.g., "off" or an open switch) for water flowing below the threshold flow rate. Flow monitoring switches may be less expensive than gauges for measuring water pressure or other flow characteristics, and therefore may be desirable to reduce the overall cost of a garden hose sprayer system.

While the sensor 222 is shown as part of a simple flow-sensitive mechanical switch 260 in FIG. 2A, according to other exemplary embodiments, other suitable gauges, sensors, meters, and the like may be provided to sense flow rates of the water flow through the garden hose spray system 210. For example, a variant exemplary sensor may include an induction magnetic switching device with a biased magnetic "torpedo" provided within the flow that is sensed by a magnetically-sensitive switch provided outside of the flow. Other embodiments include flow sensors such as Venturis, pitot static tubes, spinning pin-wheels, paddles with spring arms, and the like.

As shown in FIG. 2A, according to an exemplary embodiment, the garden hose sprayer system 210 includes an additional, manually-operated on/off switch 262 and housing. The manually-operated switch 262 may be provided in series with the flow-sensitive mechanical switch 260, wherein if the manually-operated switch 262 is in the off position, the pump 230 will not be activated, but if the manually-operated switch 262 is in the on position, then the pump 230 may be activated by the flow sensitive switch 260 or its analog. In a different embodiment, a manually-operated switch 262 is provided in parallel with the flow sensitive switch 260 or its analog, such that the manually-operated switch 262 can function as an override, activating or deactivating the pump 230 regardless the flow rate. In some embodiments, the housing further includes a capacitor, a motor control circuitry, a power switch, a circuit breaker, and other electronics. The plug may be a standard plug and may include a ground fault circuit interrupter.

Energized water flow exits from the pump 230 through the outlet 235. According to an exemplary embodiment, a flexible hose 217, such as a common garden hose, is coupled to the outlet 235 with the hose coupler or garden hose connector 236 (e.g., threaded fittings, quick connect, snap fittings, and the like). The flexible hose 217 may be made from a wide variety of commonly known materials such as vinyl, rubber, composite, and the like. For example, typical garden hose (or "hosepipe") characteristics may vary depending design choice, such as hose dimensions, gauge, material, reinforcement, and the like. Some exemplary garden hoses are constructed of a synthetic rubber and/or soft plastic. These hoses are reinforced with internal or external fiber webbings, such as nylon or polyester tire-cords. Certain exemplary hoses are "reinforced vinyl" garden hoses. Due the variety of design choices and available materials, different commercial garden hoses have a broad range of "burst strengths" or "burst ratings," the maximum allowable internal pressures that a hose can withstand before rupture. Some exemplary lower-quality hoses have a burst rating of about 1.4 MPa (200 psi). Other exemplary medium-quality hoses have burst ratings ranging from about 1.9 to 2.4 MPa (275 to 350 psi). Still other exemplary higher-quality garden hoses have burst ratings from about 2.4 to 3.4 MPa (350 to 500 psi) or higher, such as about 7 MPa (1000 psi). Therefore, booster water spraying systems, such as those described herein that may operate with typical garden hoses, may be better suited for such operation than "true" pressure washers due to characteristics of the garden hoses, such as their "burst ratings."

A variable outlet 240 (e.g., sprayer, nozzle, spout, head, fountain, sprinkler, flow sink, and the like) may be provided on a remote end of the hose 217. The variable outlet 240 is coupled to the hose 217 with a commonly known fitting or coupling and is configured to allow a user to manage the water flow out of the garden hose sprayer system 210 (e.g., point and spray). According to some preferred exemplary embodiments, the variable outlet 240 may include multiple mechanisms for controlling water output, such as a rotatable head portion 242, which may include a plurality of patterned openings 246, 248 of different sizes and/or shapes; a flow restriction valve 250; and/or a flow control valve 252.

In some embodiments the flow-restriction valve 250 is manipulated by a trigger 254 located on the variable output 240. The flow-restriction valve 250, for example, may be configured to be opened when a user pulls the trigger 254, allowing water to be expelled from the variable output 240 through one of the openings 246, 248, and closed when a user releases the trigger 254. To this end, the flow-restriction valve 250 may be biased to the closed position with a spring, an elastic band, a counterweight, and/or other suitable biasing member.

The variable output 240 may also include a chemical container 272 for storing and transferring chemicals into the water flow. For example, the container may hold a liquid plant fertilizer that is pulled into the water flow by a lower pressure Venturi within the flow path (much like fuel insertion in air passing through a carburetor of a combustion engine, or aeration systems in fish tanks) In other embodiments, mechanical energy is transferred from pulling the trigger 254, to squeeze chemicals from the container into the water flow.

As shown in FIG. 2B, the rotatable head portion 242 includes at least a larger opening 248 and a smaller opening 246 through which water may exit from the variable outlet 240. For example, the head portion 242 may be adjusted such that the water flow exits the variable outlet 240 through either the smaller opening 246 or the larger opening 248. The larger opening 248 allows a greater flow rate through the garden hose sprayer system 210 than the smaller opening 246. According to other exemplary embodiments, the water flow may exit through a variety of other openings of differently-shaped patterns having cross-sectional areas of greater or lesser discreet magnitudes relative to openings 246, 248.

As shown in FIG. 2C, according to still other exemplary embodiments, the head portion 242 may include a single, continuous opening with a varied cross-sectional width 249 instead of a plurality of discreet openings. By exposing different portions of the single opening 249 to the water flow, the water exit stream may pass through openings with different cross-sectional areas, affecting the flow rate in a manner similar to the different-sized discreet openings 246, 248 in FIG. 2B. In still other embodiments, the head portion 242 may include a screw-type constricting valve for varying the nozzle opening cross-sectional area.

According to still other exemplary embodiments, a user may adjust the flow rate of the variable output 240 with a flow control valve 252. Such a valve 252 may be provided internally in the variable output 240 and be any of a wide variety of different types of valves (e.g., a gate valve, poppet valve, plug valve, butterfly valve, globe valve, ball valve, etc.). Embodiments including a flow control valve 252 may gradually constrict or release water flow through the outlet 240, for example, by tightening or loosening the valve, such as by a knob and screw mechanism.

Figure 3A:
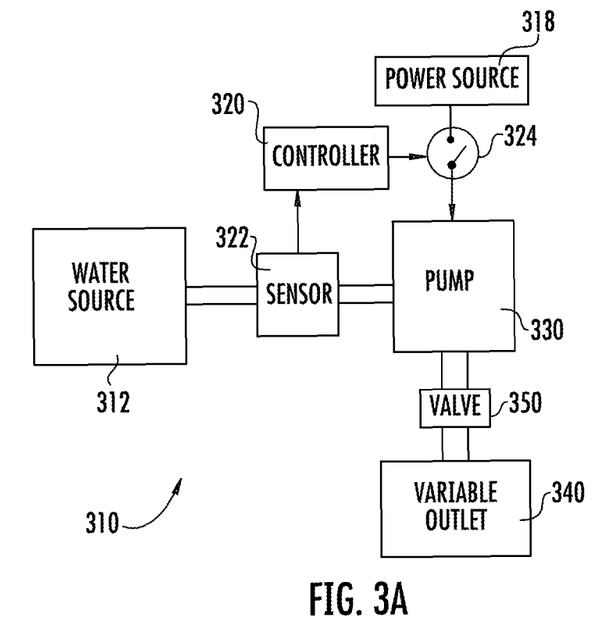
FIG. 3A is a block diagram of a garden hose spray system according to an exemplary embodiment.
Figure 3B:
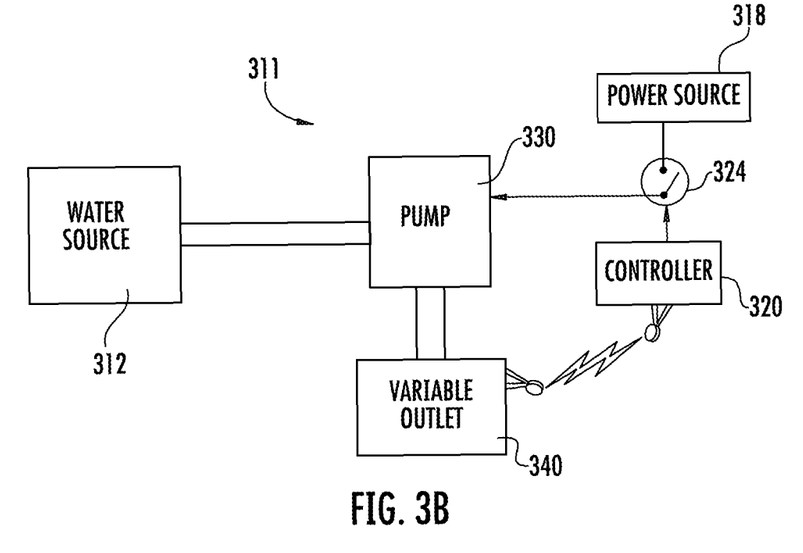
FIG. 3B is a block diagram of a garden hose spray system according to another exemplary embodiment.

Referring to FIGS. 3A and 3B, block diagrams of similar garden hose spray systems 310, 311 are shown according to exemplary embodiments. In FIG. 3A, the garden hose spray system 310 is configured to be coupled to a typical household or commercial property water supply/source 312 (e.g., hose bib, faucet, and the like). A pump 330 is provided to energize a water flow through the system 310, such as to increase water pressure, momentum, work, temperature, exit velocity, flow rate, and/or other characteristics of the water flow that are functions of energy. The pump 330 is powered by a power source 318, such as a AC current source, a DC current source, a gas-powered electric generator, a combustion engine, a solar panel array, a battery, and/or another power source.

The garden hose spray system 310 further includes a controller 320 in communication (e.g., fluidic, mechanical, wired, wireless, and/or other communication) with the pump 330, and the controller 320 operates a switch 324 provided between the power source 318 and the pump 330. Closing the switch 324 allows power to drive the pump 330 and opening the switch 324 prevents power from driving the pump 330.

In the FIG. 3A embodiment, the controller 320 is further coupled to a sensor 322. The sensor 322 detects, monitors, senses, and/or is affected by the flow rate of the water flow through the garden hose spray system 310. In some embodiments, the sensor 322 can distinguish between a no-flow condition and a positive flow condition. In another set of embodiments, the sensor 322 can distinguish between two or more different positive (non-zero) flow rates. The controller 320 uses readings from the sensor 322 to operate the switch 324 to activate the pump 330. Pump 330 activation as a function of a non-zero flow rate may be especially useful for situations where a lower pressure, lesser flow is desirable; along with a quick adjustment to a more powerful high flow, such as switching between gently watering flowers to removing dried-on mud from a deck floor.

The garden hose spray system 310 further includes a variable outlet 340 operable at a first flow setting and a second flow setting, such as a sprayer head, nozzle, spraying brush, and the like, with adjustable flow rate settings having a plurality of discreet "calibrated" outlet cross-sectional patterns, as shown in FIG. 3B for example. For example, the first flow setting may correspond with a non-zero flow rate less than a threshold flow rate and the second flow setting may correspond with a flow rate greater than the threshold. The sensor 322 can determine which setting is operating by reading a corresponding flow rate. In some embodiments, the controller 320 then directs, operates, manipulates, adjusts, and/or flips the switch 324 to activate the pump 330 when the water flow rate exceeds the predetermined, non-zero threshold flow rate. Exemplary threshold values range from approximately 60 to 300 cm$^3$/s (1 to 5 gpm), preferably from approximately 125 to 250 cm$^3$/s (2 to 4 gpm). Exemplary threshold values range even more preferably from approximately 150 to 225 cm$^3$/s (2.5 to 3.5 gpm), such as 190 cm$^3$/s (3 gpm). In still other embodiments, the threshold can be manually changed by adjusting the bias of a biasing member (e.g., spring position, flexible rod length, and the like) associated with the sensor 322 for example.

According to one exemplary embodiment, as shown in FIG. 3A, the sensor 322 is provided between the water source 312 and the pump 330. However placement of the sensor 322 in the system 310 may vary with embodiments within the scope of the invention. In other exemplary embodiments, a sensor is provided after a pump outlet— either between the pump 330 and the variable outlet 340, or as part of the variable outlet 340. Additionally a valve 350 may be placed in series with the system 310, to prevent flow of water through the system when the valve 350 is closed, and to allow flow when the valve 350 is open. For example, the valve 350 may be coupled to a squeeze-operated handle or trigger, a rotatable flow-blocking gate, a constricting valve, and/or the like.

In the embodiment of FIG. 3B, the garden hose spray system 311 also includes a pump 330 that may be activated by a controller 320 and switch 324 coupled to a power source 318, and the system 311 may be coupled to a water source 312. In the system 311, a variable outlet 340 is in a wireless communication (e.g., radio frequency or other electro-magnetic radiation, including a receiver and transmitter, as shown in FIG. 3B, which may be in signal communication between the controller and the variable outlet, the variable outlet and the pump, and between other parts) with the controller 320 such that selection of a variable outlet setting, and possibly other information such as valve release by a trigger on the variable outlet 340, is communicated to the controller 320. According to another exemplary embodiment, a flow rate sensor is provided proximate to the variable outlet 340. In still other embodiments, a wired communication cable connects the variable outlet 340 to the controller 320, for example, the wire is coupled to a hose connecting the variable outlet with the pump 330 and controller 320 (see also FIG. 5).

Figure 4:
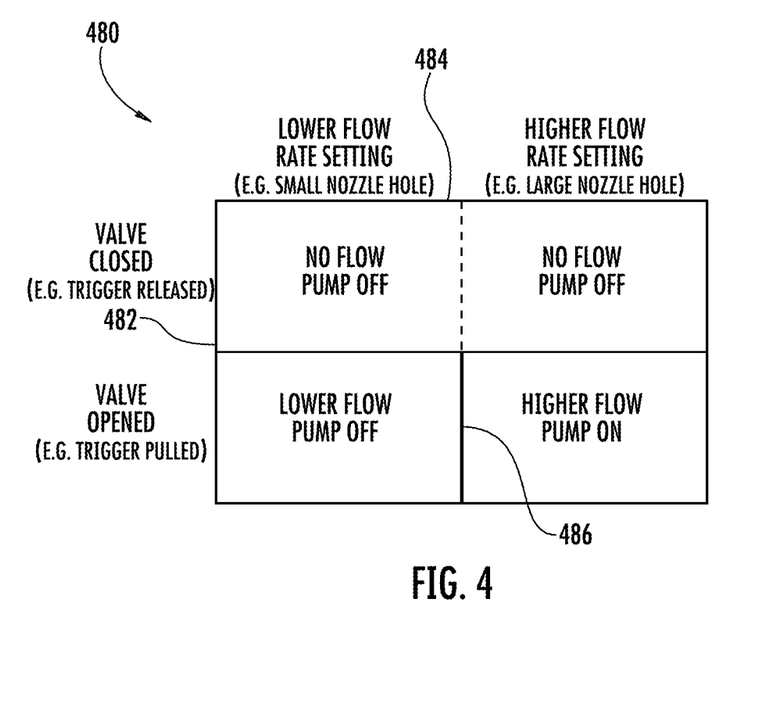
FIG. 4 is a diagram of a control matrix for a spray system according to an exemplary embodiment.

FIG. 4 presents a matrix 480 that summarizes a control logic for operation of the embodiment system 310. On one side 482 of the matrix 480 is a valve 350 condition: an opened or closed valve condition. On another side 484 of the matrix 480 is a positive flow rate condition: a higher flow condition above a threshold 486, and a lower flow condition below the threshold 486. For example, instead of a distinction between a zero-flow condition versus a positive-flow-rate condition being a factor for controlling pump 330 activation, the pump 330 is activated by the controller 320 capable of distinguishing between at least two positive flow rates of water through the garden hose spray system. According to the control matrix 480 embodiment, the pump 330 is only activated when both the valve 350 is open and the higher flow rate setting is used. Activating the pump 330 only at times when additional boosting with a high flow-rate is desired, reduces the amount of time the pump 330 is active, which may further reduce power consumption, noise, wear on moving parts, and the like associated with the operation of the pump 330. For example, a controller with logic designed to implement the rules of the control matrix 480 may be more efficient in terms conservation of energy, as well as conservation of user control effort and time, than controllers that automatically turn on a pump when a positive flow rate is sensed regardless of rate, because a garden hose user may not need (or want) a boosted flow for many applications or sub-applications (such as watering the flowers).

A logic module, algorithm, and/or scheme configured to apply the logic presented in the matrix 480 may be implemented in several steps. In some embodiments, a sensor may produce a reading, and the reading may be relayed to a control circuitry, as discussed below in regard to FIG. 5. The sensor reading may be converted to a relevant parameters, for example by amplifying the reading, filtering noise from the reading, and digitizing the reading. The reading may then be compared to a designated threshold, such as threshold 486 and/or other thresholds, or a threshold computed in a processor based in part upon the reading. The comparison may occur in a processor under instructions of the logic module, which may be stored in a memory of a computer for example. If the sensor reading corresponds to a parameter exceeding the threshold parameter, then the processor may output a command that may be relayed to a pump or to a switch governing power to the pump. The command may direct the pump to activate and/or to operate at a particular speed, capacity, level and the like. In other embodiments, the command may activate a delay timer set to a predetermined period. Following the period, another command may be relayed to the pump and/or to the switch. If the sensor reading corresponds to a parameter not exceeding the threshold, then the processor may output a different command. For example, the different command may deactivate the pump, or change the pump speed, capacity, level and the like. In still other embodiments, a logic module may incorporate steps that open and close a valve on a variable outlet, or adjust a spray opening cross-sectional area on the variable outlet.

In some embodiments, with the motor 232 as a combustion engine, a logic module (or algorithm) may include a controller interaction with components for controlling the combustion engine. For example, if a flow sensitive switch senses a positive flow, and relays the flow information to the controller, the controller may then activate a solenoid that engages a clutch (e.g., centrifugal clutch) coupled to a crankshaft of the engine (e.g., acting as a mechanical switch). The crankshaft may then power the pump. However, if the flow sensitive switch senses no flow, or a positive flow rate less than a threshold flow rate, then the controller may activate a solenoid to disengage the clutch, idle the engine, and decouple the crankshaft from the pump. In some exemplary embodiments with combustion engines, variant logic algorithms may have the controller idle the engine when the flow is below the threshold, turn off the engine, or idle the engine for a set time period of sensed flow rate below the theshold before turning off the engine.

Other embodiments, such as those similar to system 311 of FIG. 3B, operate without a flow control valve. For example, water continuously flows through the system 311, either with the pump 330 on or off when the water source is actively supplying a water flow to the system. As such, a control matrix for the system 311 would not distinguish between conditions of the valve 482, and instead the controller 320 would simply activate the pump 330 upon sensing a water flow rate 484 greater than the non-zero threshold 486.

Figure 5:
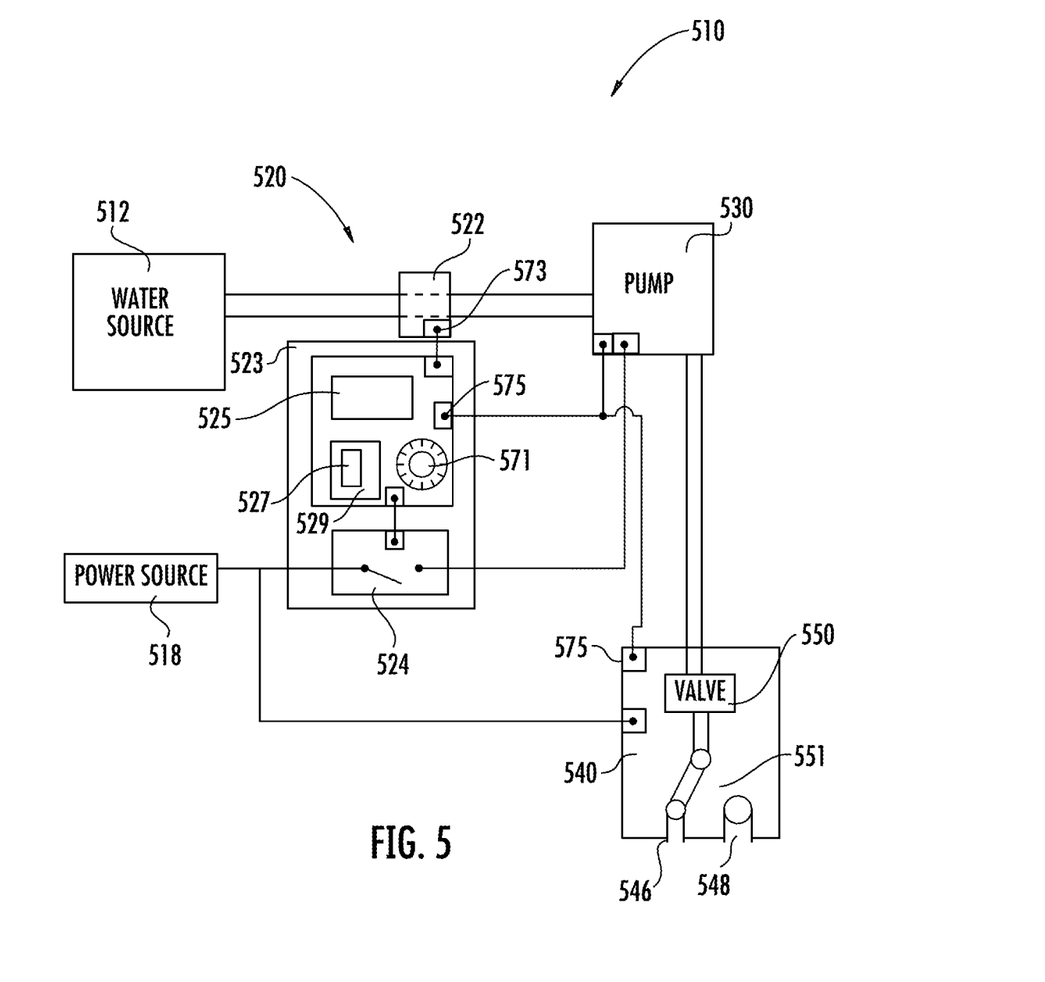
FIG. 5 is a block diagram of a garden hose spray system according to yet another exemplary embodiment.

FIG. 5 shows an exemplary booster water spraying system 510 as a block diagram. Similar the systems 310, 311 of FIG. 3, the system 510 of FIG. 5 includes a pump 530 and a variable outlet 540, and the system 510 is attachable to a water source 512 and a power source 518. The system 510 also has a controller 520 or control circuit, which may include a computer, microprocessor, an application specific integrated circuit, an analog computer, a digital computer, a supercomputer, a computer network, a laptop or desktop computer, a calculator, a hybrid, and the like.

Further referring to FIG. 5, the controller 520 has a control circuit 523 electrically coupled to a switch 524 and a sensor 522. In some embodiments, the sensor 522 measures a water flow state in or related to the system 510, such as flow rate, pressure, velocity, momentum, temperature, and other state characteristics. In other embodiments, the sensor 522 measures parameters that may be related to the water flow state, such as strain or stress in a hose wall, time, vibration amplitude or other parameters. In some embodiments, the switch 524 is an electrical switch able to allow or deny electrical power to the pump. In other embodiments, the switch 524 is a mechanical switch able to allow or deny power to the pump 530, such as a clutch-type switch, a hydraulic or pneumatic bypass-type switch, and the like. The switch 524 may be opened, closed, governed, controlled, actuated, adjusted, manipulated, and the like by the controller 520 and/or a user, such as by communicating a command to an electric switch driver, an electric actuator, a mechanical actuator, a hydraulic or pneumatic actuator, by hand, and the like.

The control circuit 523 of FIG. 5 further includes a processor 525, a logic module 527, a memory 529, and a user interface 571. Additional interfaces 573, 575 may allow for data transmission and other communication between the controller 520 and the sensor 522, the pump 530, the variable outlet 540, and/or other items. The interfaces 571, 573, 575 may be coupled via data transmission or communication media, such as fiber optic or coaxial cable, wiring, radio or infrared signal transmitters and receivers, hydraulic or pneumatic channels, mechanical linkages, and the like. The logic module 527 of the controller 520 may receive inputs from the sensor 522, the pump 530, the variable outlet 540, and/or other items such as a digital clock, a band-pass filter for removing electronic noise, and the like. For example, one input could be a measured flow rate and another input could be a measured time, such as for a series of logical steps that include a time delay step, prior to a pump response step that is in reaction to a sensed change in flow rate step. Additional inputs may be delivered to the controller 520 via the user interface 571, which is shown in FIG. 5 as a turnable knob or dial to adjust the flow rate threshold, for example. Other user interfaces include keyboards, touch-sensitive screens, buttons, toggles, and the like.

In some embodiments, the logic module 527 is configured to implement one or more steps based upon the matrix shown in FIG. 4. In other embodiments, the logic module 527 includes response time delay steps, threshold adjustment steps in response to variable output settings selection steps, and other steps. Inputs and logic may be evaluated, analyzed, manipulated, calculated, and the like by the processor 525. The processor 525 and/or one or more components coupled to processor 525 may be configured to provide a controller output signal or command to other components in the system 510, such as the pump 530, the variable outlet 540, switches 524, 551, the sensor 522, and/or other circuit elements. As such, the output signal or command (e.g., a magnitude, a frequency, and the like) may be based upon calculations performed in the processor 525.

The processor 525 can be or include one or more processing components or processors. The processor 525 can be a general purpose processor, an application-specific integrated circuit, and/or any other collection of circuitry components configured to conduct the calculations or to facilitate the activities described herein. The processor 525 can be configured to execute computer code, script code, object code, and/or other executable instructions stored in memory 529, other memory, or in the processor 525. In some embodiments, the memory 529 may store coded instructions, such as the logic module 527, in various states, such as volatile, non-volatile, RAM, ROM, solid states, and the like. In certain embodiments, the logic module 527 may be stored in a separate memory, such as a memory of one or more remote computers coupled to the system 510 via an external computer network, local area network, and/or the internet.

Also referring to FIG. 5, the variable outlet 540 includes a valve 550 and a hydraulic switch 551, wherein the hydraulic switch 551 has two positive flow settings: a higher-flow setting 548 and a lower-flow setting 546. The variable outlet 540 may be powered hydraulically from the water flow, from the power source 518, from batteries, and/or from another source. As mentioned, the variable outlet 540 may be in communication with the controller 520 through an interface 575. Like the switch 524, the hydraulic switch 551 may be adjusted by the controller 520 and/or a user via a switch driver or an actuator.

Figures 6A, 6B, 6C, 6D:
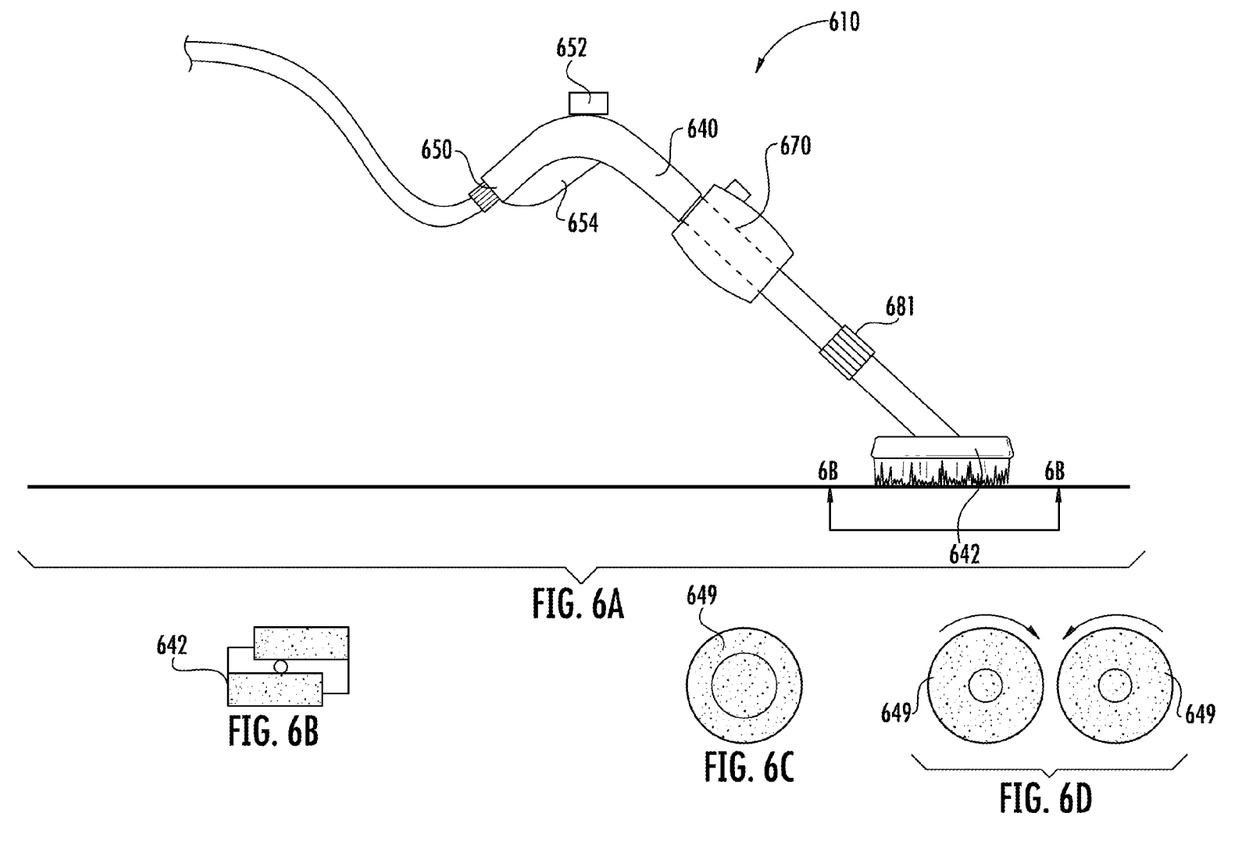
FIG. 6A is a side view of a broom for a garden hose spray system according to an exemplary embodiment.
FIG. 6B is a bottom view of a broom head for the broom of FIG. 6A according to an exemplary embodiment.
FIG. 6C is a bottom view of a broom head for the broom of FIG. 6A according to another exemplary embodiment.
FIG. 6D is a bottom view of a broom head for the broom of FIG. 6A according to yet another exemplary embodiment.
Figure 7A:
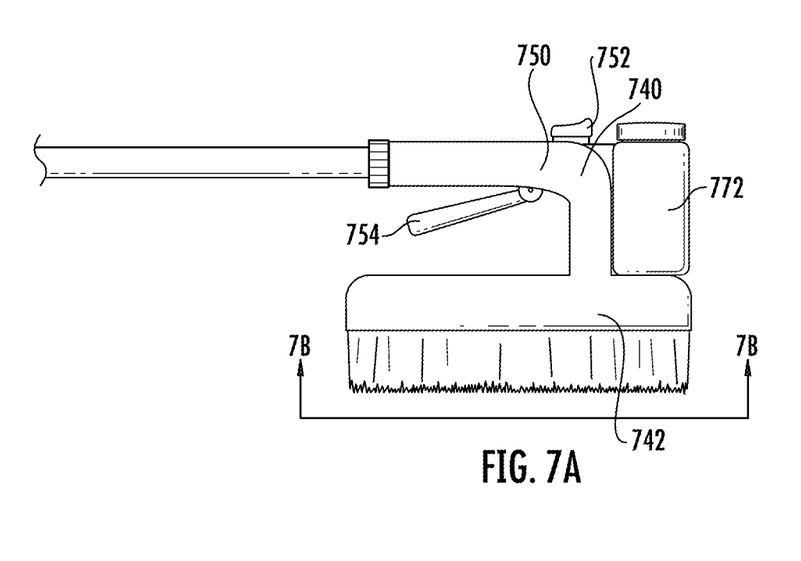
FIG. 7A is a side view of a scrubbing brush for a garden hose spray system according to an exemplary embodiment.
Figure 7B:
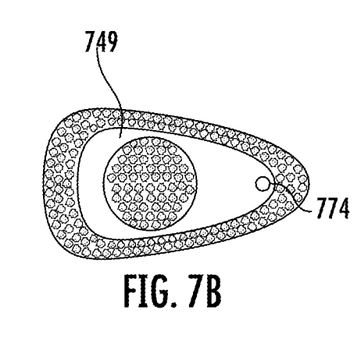
FIG. 7B is a bottom view of a scrubbing brush head for the brush of FIG. 7A according to an exemplary embodiment.

FIGS. 6-7 show embodiments of sprayer systems 610, 710 that are similar to systems 210, 310, 311, and 510. Systems 610 and 710 operate with a broom variable outlet 640 and a brush variable outlet 740 in place of the sprayer variable outlet 240 having a multi-patterned nozzle (e.g., as shown in FIGS. 2B & 2C). Some features compatible with the embodiment systems 610, 710 such as pumps, faucets, flow monitoring switches, and the like are not shown in FIGS. 6-7, because they are similar to those corresponding features presented in the prior figures and described herein.

Referring to FIGS. 6A, 6B, 6C, and 6D the system 610 includes a broom variable outlet 640 that further includes a biased release trigger 654 coupled to a flow restriction valve 650, a brush head 642, and a flow control valve 652. A way to increase or decrease water flow through the system 610 is to adjust the flow control valve 652, which is shown as a constriction valve coupled to a rotatable knob. FIGS. 6B, 6C, and 6D show exemplary embodiments of the brush head 642 wherein both embodiments include hydraulically driven brush head parts. In other embodiments brush heads may be driven by motors. The first brush head 642 of FIG. 6B includes parallel scrubbers that move back and forth relative to each other. The brush head 649 of FIG. 6C includes two circular scrubbers, one circumscribed by the other, where either one of the circular scrubbers rotates and the other remains fixed, or both rotate at different rates and/or in opposite directions. FIG. 6D shows a brush with two concentric-circular brush heads 649, both like the brush of FIG. 6C, where the heads 649 of FIG. 6D are mechanically coupled to rotate in opposite directions. Additionally, the broom variable outlet system 610 further includes a chemical storage container 670 (e.g., liquid soap container) for chemical injection into the water flow, and a twisting telescoping-pole height-adjustment control joint 681, such that the length of the broom (e.g., distance between trigger 654 and brush head 642) can be increased or decreased, and locked into a specific length.

Referring to FIGS. 7A and 7B, the system 710 includes a brush variable outlet 740 that further includes a biased release trigger 754 coupled to a flow restriction valve 750, a brush head 742, and a flow control valve 752. Like the valve 652 for the broom variable outlet 640, one way to increase or decrease water flow through the system 710 is to adjust the flow control valve 752, which is shown as a constriction valve coupled to a pressable and lockable button. FIG. 7B shows an exemplary embodiment of the brush head 749 including hydraulically driven brush head parts, where a circular inner brush rotates relative to an outer brush. Additionally, the brush variable outlet system 710 includes a chemical storage container 772, for holding a chemical such as liquid soap, solvent, detergent, wax, and the like. Chemicals stored within the container 772 may then be added to the water flow through the outlet port 774 on the bottom of the brush, as shown in FIG. 7B. In other embodiments, the chemicals may be added to the water flow at other points in the system 710, such as before the pump, after the pump, and within the variable output 740.

Figure 8:
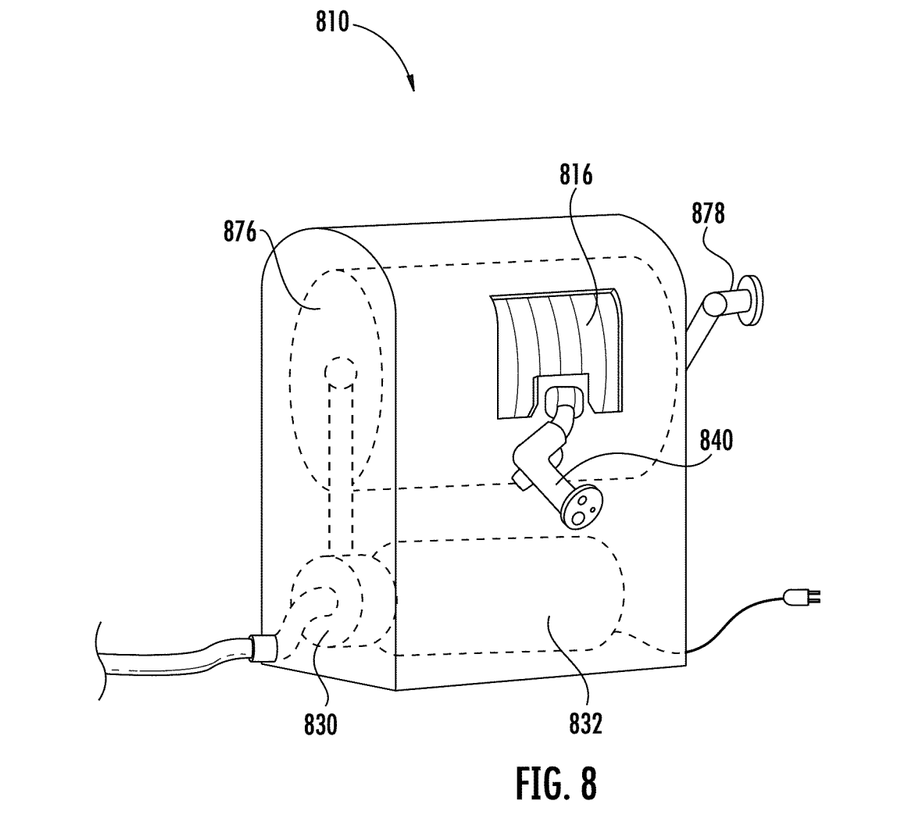
FIG. 8 is a perspective view of a garden hose storage and booster system according to an exemplary embodiment.

Referring to FIG. 8, according to an exemplary embodiment, the booster water spraying system is in the form of storage system 810 that includes a pump 830 and a motor 832, both stored on or in a housing 876, a windable hose reel 816, a crank handle 878, and a hose with a spray gun 840. In some embodiments the motor 832 is a combustion engine; and in other embodiments, the motor is an electric motor. In certain embodiments, the system 810 includes a controller for controlling the pump, as disclosed above in regard to the embodiments shown in FIGS. 3-5. Some embodiments include a pivotable cover that opens and locks closed (e.g., with a latch), and storage compartments for storing hose components (e.g., a sprinkler, additional sprayers, etc.). The housing 876 may include drawers, hooks, clips, and other structure for storing a variable outlet. The housing may be designed to be placed in a yard, remain stationary, and endure the elements. According to some exemplary embodiments, the weight of the pump 830 and motor 832, arranged proximate to the support base of the system 810, function to hold the storage system 810 in place and help to prevent tipping of the system 810 in high winds, for example.

Still referring to FIG. 8, the handle 878 can be used to crank the reel 816, to wrap the hose. Other embodiments do not include a handle 878, and instead use a powered motor to rewind the reel 816. The reel 816 may be in a location proximate to the pump 830, such that a user may be able to reach to the reel 816 to grasp a garden hose on the reel 816 while handling the pump 830. In some embodiments, a biasing member, such as a torsion spring or reel motor, is coupled the hose reel 816. After use the hose is retracted (i.e., wound back onto the reel) as the biasing member winds the reel. In some embodiments, the torsion spring may also be coupled to a releaseable ratchet member, such that the hose will only rewind when a user releases the ratchet, in a manner similar to a typical self-retracting tape measure. Other exemplary embodiments include hose storage structures, such as the hose reel 816, hose racks and frames that are not rotatable like the reel 816. Still other embodiments include hose storage structures in the form of a storage compartment, such as drawers and cabinets, where a user simply places the hose (e.g., in a coiled stack) in the compartment.

As utilized herein, the terms "approximately," "about," "proximate," "substantially," and similar terms are intended to have a broad meaning in harmony with the common and accepted usage by those of ordinary skill in the art to which the subject matter of this disclosure pertains. These terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "exemplary" as used herein to describe various embodiments is intended to indicate that such embodiments are possible examples, representations, and/or illustrations of possible embodiments.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the accompanying drawings. The orientation of various elements may differ according to other exemplary embodiments, and that such variations are intended to be encompassed by the present disclosure.

The construction and arrangement of the garden hose spray system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A water spraying system comprising:
   an engine;
   a pump driven by the engine, the pump including a pump inlet configured to be fluidly coupled to a water source and a pump outlet providing water at an increased water pressure;
   a sprayer fluidly coupled to the pump outlet, the sprayer including a flow restriction valve and a trigger for manipulating the flow restriction valve so that movement of the trigger selectively opens and closes the flow restriction valve;
   a flow sensor configured to sense a flow of water into the pump;
   a controller coupled to the flow sensor, wherein the controller is configured to activate the pump by starting the engine when the sensed flow is above a threshold flow, and wherein the controller is configured to turn off the engine following a set time period of sensed flow below the threshold flow; and
   a user interface coupled to the controller, the user interface configured to receive input for adjustment of the threshold flow.

2. The water spraying system of claim 1, wherein the flow sensor is located proximate the pump inlet.

3. The water spraying system of claim 1, wherein the controller is further configured to idle the engine when the sensed flow is below the threshold flow.

4. The water spraying system of claim 1, further comprising:
   a pressure sensor located between the water source and the pump, the pressure sensor configured to sense a pressure of water provided to the pump.

5. The water spraying system of claim 1, wherein the threshold flow is greater than zero.

6. The water spraying system of claim 1, further comprising:
   a manually-operated on/off switch configured to prevent activation of the pump when in an off position.

7. A water spraying system comprising:
   an engine;
   a pump driven by the engine, the pump including a pump inlet configured to be fluidly coupled to a water source and a pump outlet providing water at an increased water pressure;
   a sprayer including a flow restriction valve and a trigger for manipulating the flow restriction valve so that movement of the trigger selectively opens and closes the flow restriction valve;
   a hose fluidly coupling the pump outlet to the sprayer;
   a sensor configured to sense a water flow state, the sensor located proximate the pump inlet; and
   a controller coupled to the sensor, wherein the controller is configured to activate the pump by starting the engine when the sensed water flow state indicates a positive flow condition, and wherein the controller is configured to turn off the engine when the sensed water flow state indicates a no-flow condition for a set time period.

8. The water spraying system of claim 7, wherein the sensor is configured to sense a water flow rate.

9. The water spraying system of claim 7, wherein the sensor is configured to sense a water pressure.

10. The water spraying system of claim 7, wherein the sensor is configured to sense a water flow rate and a water pressure.

11. The water spraying system of claim 7, wherein the sensor is configured to sense the water flow state into the pump.

12. The water spraying system of claim 11, wherein the sensor is configured to sense a water flow rate.

13. The water spraying system of claim 11, wherein the sensor is configured to sense a water pressure.

14. The water spraying system of claim 11, wherein the sensor is configured to sense a water flow rate and a water pressure.

15. A pressure washer comprising:
   an engine;
   a pump driven by the engine, the pump including a pump inlet configured to be fluidly coupled to a water source and a pump outlet providing water at an increased water pressure;
   a sprayer including a flow restriction valve and a trigger for manipulating the flow restriction valve so that movement of the trigger selectively opens and closes the flow restriction valve;
   a hose fluidly coupling the pump outlet to the sprayer;
   a flow sensor configured to sense a flow of water provided to the pump; and
   a controller coupled to the flow sensor, wherein the controller is configured to activate the pump by starting the engine when the sensed flow indicates a positive flow condition, and wherein the controller is configured to turn off the engine following a set time period of sensed flow at a no-flow condition.

16. The pressure washer of claim 15, wherein the flow sensor is located proximate the pump inlet.

17. The pressure washer of claim 15, further comprising:
a pressure sensor located between the water source and the pump, the pressure sensor configured to sense a pressure of water provided to the pump.

* * * * *